US012692200B2

(12) United States Patent
Ishida et al.

(10) Patent No.: US 12,692,200 B2
(45) Date of Patent: Jul. 28, 2026

(54) COMPOSITE POLYCRYSTAL AND TOOL WITH COMPOSITE POLYCRYSTAL

(71) Applicant: SUMITOMO ELECTRIC HARDMETAL CORP., Hyogo (JP)

(72) Inventors: Yuh Ishida, Hyogo (JP); Michiko Matsukawa, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 438 days.

(21) Appl. No.: 18/566,633

(22) PCT Filed: Jun. 11, 2021

(86) PCT No.: PCT/JP2021/022257

§ 371 (c)(1),
(2) Date: Dec. 2, 2023

(87) PCT Pub. No.: WO2022/259508

PCT Pub. Date: Dec. 15, 2022

(65) Prior Publication Data

US 2024/0368040 A1    Nov. 7, 2024

(51) Int. Cl.
*C04B 35/528* (2006.01)
*B24D 5/02* (2006.01)
*C04B 35/52* (2006.01)

(52) U.S. Cl.
CPC .............. *C04B 35/528* (2013.01); *B24D 5/02* (2013.01); *C04B 35/522* (2013.01);
(Continued)

(58) Field of Classification Search
CPC ......... C01B 32/25; C01B 32/26; C01B 32/28; B01J 3/06; B01J 3/062; B01J 3/065;
(Continued)

(56) References Cited

U.S. PATENT DOCUMENTS 3,913,280 A * 10/1975 Hall ........................ C04B 35/52
51/307
2008/0022806 A1 1/2008 Sumiya
(Continued)

FOREIGN PATENT DOCUMENTS

JP        5-194089 A    8/1993
WO    2005/065809 A1    7/2005
(Continued)

OTHER PUBLICATIONS

Written Opinion of the International Search Authority in PCT/2021/022257 (Jul. 20, 2021) (Year: 2021).*
(Continued)

*Primary Examiner* — Daniel C. Mccracken

(74) *Attorney, Agent, or Firm* — Renner, Otto, Boisselle & Sklar, LLP

(57) ABSTRACT

A polycrystalline composite comprising diamond particles and non-diamond carbon, wherein: the sum of the content Vd of the diamond particles and the content Vg of the non-diamond carbon is more than 99% by volume based on the total volume of the polycrystalline composite; the median diameter d50 of the diamond particles is 10 nm or more and 200 nm or less; the dislocation density of the diamond particles is $1.0 \times 10^{13}$ m$^{-2}$ or more and $1.0 \times 10^{16}$ m$^{-2}$ or less; and the content Vd of the diamond particles and the content Vg of the non-diamond carbon satisfy the relationship represented by the formula 1:$0.01 < Vg/(Vd+Vg) \leq 0.5$ Formula 1.

9 Claims, 1 Drawing Sheet

(52) U.S. Cl.
  CPC .. *C04B 2235/425* (2013.01); *C04B 2235/427*
        (2013.01); *C04B 2235/725* (2013.01)

(58) Field of Classification Search
  CPC .. B01J 3/067; B01J 3/08; C30B 29/04; C23C
        16/26; C23C 16/27; C23C 16/271; C23C
        16/272; C23C 16/274; C23C 16/275;
        C23C 16/276; C23C 16/277; C23C
        16/278; C23C 16/279; C23C 14/06; C23C
        14/0605; C23C 14/0611; C04B 35/528;
        C04B 35/522; C04B 2235/425; C04B
        2235/427; C04B 2235/725; C04B
        2235/405; C04B 2235/421; C04B
        2235/5436; C04B 2235/6567; C04B
        2235/661; C04B 35/645; C04B 2235/72;
        C04B 2235/722; C04B 2235/723; C04B
        2235/781; C04B 2235/782; C04B
        2235/785; C04B 2235/80; B24D 5/02
  See application file for complete search history.

(56) References Cited

U.S. PATENT DOCUMENTS

| | | |
|---|---|---|
| 2017/0050886 A1 | 2/2017 | Satoh et al. |
| 2017/0333998 A1 | 11/2017 | Sumiya et al. |
| 2017/0349441 A1 | 12/2017 | Ishida et al. |
| 2018/0001391 A1 | 1/2018 | Sumiya et al. |
| 2019/0060968 A1 | 2/2019 | Sumiya et al. |

FOREIGN PATENT DOCUMENTS

| | | |
|---|---|---|
| WO | 2015/166730 A1 | 11/2015 |
| WO | 2017/073257 A1 | 5/2017 |
| WO | 2017/073293 A1 | 5/2017 |
| WO | 2017/073297 A1 | 5/2017 |
| WO | 2017/073424 A1 | 5/2017 |

OTHER PUBLICATIONS

H. Sumiya et al., Japanese Journal of Applied Physics 48 (2009) 120206(1-3) (cited in specification).
T. Ungar and A. Borbely, "The effect of dislocation contrast on x-ray line broadening: A new approach to line profile analysis", Appl. Phys. Lett., vol. 69, No. 21, p. 3173, 1996 (cited in specification).
T. Ungar, S. Ott, P. Sanders, A. Borbely, J. Weertman, "Dislocations, grain size and planar faults in nanostructured copper determined by high resolution X-ray diffraction and a new procedure of peak profile analysis", Acta Mater., vol. 46, No. 10, pp. 3693-3699, 1998 (cited in specification).
Pantea, C. et al., High-pressure effect on dislocation density in nanosize diamond crystals, diamond & Related Materials., 2004, vol. 13, pp. 1753-1756, doi: 10.1016/j.diamond.2004.03.005.
Pantea, C. et al., "Dislocation density and graphitization of diamond crystals", Physical Review B, vol. 66, No. 9, Sep. 1, 2002, 6 pages.

\* cited by examiner

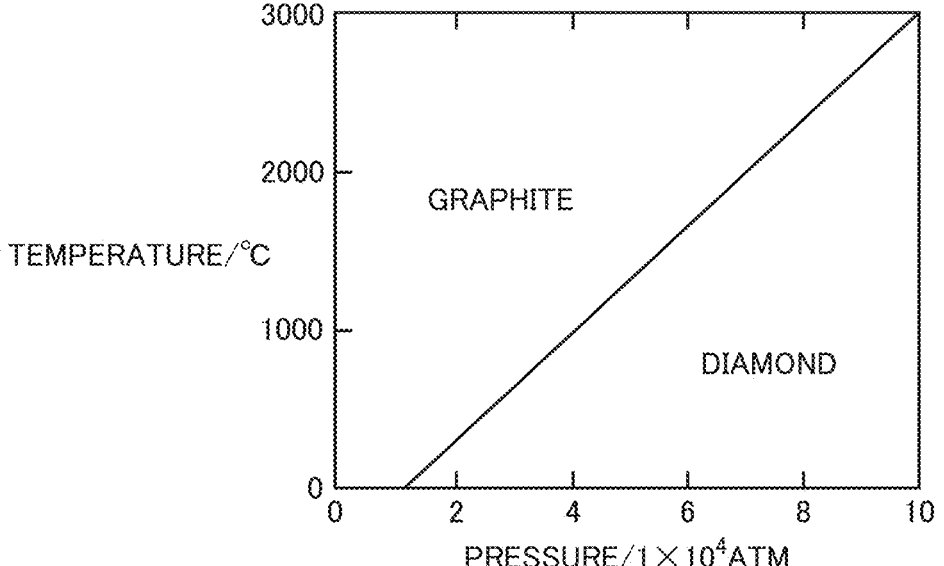

COMPOSITE POLYCRYSTAL AND TOOL WITH COMPOSITE POLYCRYSTAL

TECHNICAL FIELD

The present disclosure relates to a polycrystalline composite and a tool comprising the polycrystalline composite.

BACKGROUND ART

Polycrystalline diamond is widely used for tools such as cutting bits, dressers and dies, drilling bits, and the like, because it has an excellent hardness and neither directional hardness or cleavage.

Conventional polycrystalline diamond has been produced by sintering diamond powder as a raw material with a sintering aid or binder material under conditions of a high pressure and a high temperature (generally, a pressure of about 5 to 8 GPa and a temperature of about 1,300 to 2,200° C.) under which diamond is thermodynamically stable. The sintering aid to be used has been an iron group element metal such as Fe, Co or Ni, or a carbonate such as $CaCO_3$. The binder material to be used has been a ceramic such as SiC.

The polycrystalline diamond produced by the above method contains a sintering aid or binder material. The sintering aid and binder material may cause deterioration of mechanical properties such as hardness and strength or heat resistance of the polycrystalline diamond.

A polycrystalline diamond obtained by removing a sintering aid from the diamond polycrystal by acid treatment, and a polycrystalline diamond having excellent heat resistance produced by using a heat-resistant SiC as a binder material are also known. However, such a polycrystalline diamond has a low hardness or strength and thereby insufficient mechanical properties as a material for tools.

Such a non-diamond carbon material as graphite, glassy carbon, amorphous carbon and onion-like carbon can be directly converted into diamond under ultra-high pressure and high temperature without sintering aid or the like used. Polycrystalline diamond can be produced by directly converting the non-diamond phase to the diamond phase and simultaneously performing sintering (WO 2005/065809 (PTL 1) and H. Sumiya et al., Japanese Journal of Applied Physics 48 (2009) 120206 (NPL 1)).

CITATION LIST

Patent Literature

PTL 1: WO 2005/065809
PTL 2: WO 2017/073293

Non Patent Literature

NPL 1: H. Sumiya et al., Japanese Journal of Applied Physics 48 (2009) 120206

SUMMARY OF INVENTION

A polycrystalline composite of the present disclosure is a polycrystalline composite comprising diamond particles and non-diamond carbon, wherein:

the sum of the content Vd of the diamond particles and the content Vg of the non-diamond carbon is more than 99% by volume based on the total volume of the polycrystalline composite;

the median diameter d50 of the diamond particles is 10 nm or more and 200 nm or less;

the dislocation density of the diamond particles is $1.0 \times 1013$ m$^{-2}$ or more and $1.0 \times 1016$ m$^{-2}$ or less; and the content Vd of the diamond particles and the content Vg of the non-diamond carbon satisfy the relationship represented by the formula 1:

$$0.01 < Vg/(Vd + Vg) \le 0.5. \qquad \text{Formula 1}$$

A tool of the present disclosure comprises the polycrystalline composite described above.

BRIEF DESCRIPTION OF DRAWING

FIG. 1 is a phase equilibrium diagram of carbon.

DETAILED DESCRIPTION

Problem to be Solved by the Present Disclosure

WO 2017/073293 (PTL 2) discloses a polycrystalline composite comprising polycrystalline diamond formed by direct bonding of diamond particles to each other and non-diamond carbon dispersed in the polycrystalline diamond, wherein the polycrystalline composite has a hydrogen concentration of more than 1,000 ppm and 20,000 ppm or less. The polycrystalline composite of PTL 2 is suitable for wear-resistant tools such as wire drawing dies, because it has an excellent wear resistance. In recent years, there has been a need for more efficient wire drawing (for example, having a higher wire drawing speed), and further improvements in the performance of a polycrystalline composite containing diamond particles and non-diamond carbon (for example, improvement in slidability, improvement in hardness, or the like) have been expected.

The present disclosure has been made in view of the above circumstances. An object of the present disclosure is to provide a polycrystalline composite having an excellent hardness and an excellent slidability, and a tool comprising the polycrystalline composite.

Advantageous Effect of the Present Disclosure

The present disclosure can provide a polycrystalline composite having an excellent hardness and an excellent slidability, and a tool comprising the polycrystalline composite.

Description of Embodiments

The aspects of the present disclosure are first listed and described.

[1] A polycrystalline composite according to one aspect of the present disclosure is a polycrystalline composite comprising diamond particles and non-diamond carbon, wherein:

the sum of the content Vd of the diamond particles and the content Vg of the non-diamond carbon is more than 99% by volume based on the total volume of the polycrystalline composite;

the median diameter d50 of the diamond particles is 10 nm or more and 200 nm or less;

the dislocation density of the diamond particles is $1.0 \times 10^{13}$ m$^{-2}$ or more and $1.0 \times 10^{16}$ m$^{-2}$ or less; and the content Vd of the diamond particles and the content Vg of the non-diamond carbon satisfy the relationship represented by the formula 1:

$$0.01 < Vg/(Vd + Vg) \le 0.5. \qquad \text{Formula 1}$$

The polycrystalline composite has a low dislocation density of diamond particles, and is thereby improved in hardness. That is, the polycrystalline composite has an excellent hardness and an excellent slidability.

[2] For the polycrystalline composite, the dislocation density of the diamond particles is preferably $2.0 \times 10^{15}$ m$^{-2}$ or more and $1.0 \times 10^{16}$ m$^{-2}$ or less. By defining the dislocation density within such a range, the polycrystalline composite has a superior hardness.

[3] For the polycrystalline composite, the dislocation density of the diamond particles is preferably $2.0 \times 10^{15}$ m$^{-2}$ or more and $7.0 \times 10^{15}$ m$^{-2}$ or less. By defining the dislocation density within such a range, the polycrystalline composite has a superior hardness.

[4] For the polycrystalline composite, the median diameter d50 of the diamond particles is preferably 10 nm or more and 100 nm or less. By defining the median diameter within such a range, the polycrystalline composite has a superior hardness.

[5] The polycrystalline composite preferably further comprises boron, wherein the content of boron is 0.01% by mass or more and 1% by mass or less based on the total mass of the polycrystalline composite. By defining the polycrystalline composite in such a manner, the polycrystalline composite has a superior slidability and an excellent electrical conductivity.

[6] The content Vd of the diamond particles and the content Vg of the non-diamond carbon preferably satisfy the relationship represented by the formula 2:

$$0.03 \le Vg/(Vd + Vg) \le 0.4. \qquad \text{Formula 2}$$

By defining the content Vd of the diamond particles and the content Vg of the non-diamond carbon in such a manner, the polycrystalline composite has a superior hardness and a superior slidability.

[7] In the polycrystalline composite of the present disclosure, the content of at least one metal element selected from the group consisting of a Group 4 element, a Group 5 element and a Group 6 element in the periodic table, and iron, aluminum, silicon, cobalt and nickel is preferably less than 1% by volume. By defining the content of at least one metal element within such a range, the polycrystalline composite has a superior hardness.

[8] In the polycrystalline composite of the present disclosure, the content of at least one inevitable impurity selected from the group consisting of hydrogen, oxygen, nitrogen, an alkali metal element and an alkaline earth metal element is preferably less than 0.1% by volume. By defining the content of at least one inevitable impurity within such a range, the polycrystalline composite has a superior hardness.

[9] A tool according to one aspect of the present disclosure comprises the polycrystalline composite described above.

The tool comprises a polycrystalline composite having an excellent hardness and an excellent slidability, and it thereby has an excellent wear resistance and an excellent slidability in high-speed machining and the like of various materials. As used herein, the term "wear resistance" means a resistance to wear of a tool during material machining.

Details of Embodiment of the Present Disclosure

Details of the embodiments of the present disclosure will be described below. However, the present disclosure is not limited to these illustrative examples. As used herein, the expression in the form of "A to Z" means from the upper limit to the lower limit of the range (that is, A or more and Z or less), and when there is no description of the unit for A and the unit is described only for Z, the unit for A is the same as the unit of Z.

<<Polycrystalline Composite>>

The polycrystalline composite according to the present embodiment is a polycrystalline composite comprising diamond particles and non-diamond carbon, wherein:

the sum of the content Vd of the diamond particles and the content Vg of the non-diamond carbon is more than 99% by volume based on the total volume of the polycrystalline composite;

the median diameter d50 of the diamond particles is 10 nm or more and 200 nm or less;

the dislocation density of the diamond particles is $1.0 \times 10^{13}$ m$^{-2}$ or more and $1.0 \times 10^{16}$ m$^{-2}$ or less; and the content Vd of the diamond particles and the content Vg of the non-diamond carbon satisfy the relationship represented by the formula 1:

$$0.01 < Vg/(Vd + Vg) \le 0.5. \qquad \text{Formula 1}$$

The polycrystalline composite comprises diamond particles and non-diamond carbon. The polycrystalline composite is basically composed of the non-diamond carbon and the diamond particles, and comprises substantially no binder phase (binder) formed by one or both of a sintering aid and a binder material. Therefore, the polycrystalline composite has a very high hardness and strength. In addition, the polycrystalline composite does not suffer from deterioration of mechanical properties or shedding of grains due to a difference in coefficient of thermal expansion from that of the binder material or due to the catalytic action of the binder material even under high temperature conditions. In one aspect of the present embodiment, the diamond particles can also be understood as crystalline grains of diamond.

The polycrystalline composite is a polycrystal composed of a plurality of diamond particles and non-diamond carbon. Therefore, the polycrystalline composite has neither directional property (anisotropy) and cleavage property exhibited by a monocrystal, and has isotropic hardness and wear resistance in all directions.

In one aspect of the present embodiment, the polycrystalline composite can be also understood to be composed of a polycrystalline diamond phase formed by direct bonding of diamond particles to each other, and non-diamond carbon dispersed in the polycrystalline diamond phase. As used herein, the expression "direct bonding of diamond particles to each other" refers to such bonding that the diamond particles are in direct contact with each other, for example, bonding of diamond particles to each other without interposing the other foreign particle such as a binder.

The polycrystalline composite may contain inevitable impurities as long as the effects of the present embodiment are exhibited. Examples of the inevitable impurity include hydrogen, oxygen, nitrogen, and a metal element such as an alkali metal element (such as lithium (Li), sodium (Na) or potassium (K)) or an alkaline earth metal element (such as calcium (Ca) or magnesium (Mg)). That is, in the present embodiment, in the polycrystalline composite, the content of at least one inevitable impurity selected from the group consisting of hydrogen, oxygen, nitrogen, an alkali metal element and an alkaline earth metal element is preferably less than 0.1% by volume. The lower limit of the content of the inevitable impurities may be, for example, 0% by volume or more. When the inevitable impurities contain two or more elements, the sum of the contents of elements is the content of the inevitable impurities.

The concentrations of hydrogen, oxygen, nitrogen and the like in the polycrystalline composite can be measured by secondary ion mass spectrometry (SIMS). As an example of this measurement method, the impurity concentration is measured using "CAMECA IMS-7f" (available from Ametech Inc.) as a device, with a primary ion species of $Cs^+$, a primary acceleration voltage of 15.0 kV, and a detection area of $\varphi$ 30 μm.

The polycrystalline composite of the present embodiment is a sintered material, but the term "polycrystalline composite" is used in the present embodiment because the sintered material is usually intended to contain a binder in many cases.

<Diamond Particles and Non-diamond Carbon>
(Content Vd of Diamond Particles and Content Vg of Non-diamond Carbon)

In the present embodiment, the sum of the content Vd of the diamond particles and the content Vg of the non-diamond carbon is more than 99% by volume and preferably more than 99% by volume and 100% by volume or less based on the total volume of the polycrystalline composite.

The content Vd (% by volume) of the diamond particles and the content Vg (% by volume) of the non-diamond carbon in the polycrystalline composite can be measured by using, in combination with an X-ray diffraction method, and a method using an energy dispersive X-ray analyzer (EDX) (for example, X-MAX80 EDS system available from Oxford Instruments) equipped with a scanning electron microscope (SEM) (for example, "JSM-7800F" (trade name) available from JEOL Ltd.) (hereinafter also referred to as "SEM-EDX"). A specific measurement method is as follows First, a polycrystalline composite is cut at an arbitrary position to prepare a sample including a cross section of the polycrystalline composite. The cross section can be prepared with a focused ion beam device, a cross-section polisher device or the like. Then, the cross section is observed with an SEM to acquire a backscattered electron image. In the backscattered electron image, regions including diamond particles and non-diamond carbon are black regions, and other regions (for example, regions including elements derived from a binder material) are gray regions or white regions. The magnification at the time of observing the cross section with the SEM is appropriately adjusted so that the number of diamond particles observed in the measurement field of view is 100 or more. For example, the magnification at the time of observing the cross section with the SEM may be 10,000 times.

Next, the backscattered electron image is subjected to binarization processing with an image analysis software ("Win ROOF ver. 7.4.5", "WinROOF2018" or the like available from MITANI CORPORATION). The above image analysis software automatically sets an appropriate binarization threshold based on the image information (a measurer does not arbitrarily set a threshold). The present inventors have confirmed that the measurement results do not vary significantly even when the brightness or the like of the image is varied. The area proportion of pixels derived from the dark field (pixels derived from diamond particles and non-diamond carbon) to the area of the measurement field of view is calculated from the binarized image. By expressing the calculated area proportion in % by volume, the sum (Vd+Vg) (% by volume) of the content of diamond particles and the content of non-diamond carbon can be determined.

The area proportion of pixels derived from the bright field (pixels derived from the other regions than diamond particles and non-diamond carbon) to the area of the measurement field of view can be calculated from the binarized image to determine the content (% by volume) of the other regions.

The present inventors have confirmed that as long as the sum (% by volume) of the content of the diamond particles and the content of the non-diamond carbon in the polycrystalline composite is measured in the same sample, little variation is observed in the measurement results even if the selected measurement field of view is changed and calculations are performed multiple times. Accordingly, the inventors have believed that even if the measurement field of view is set arbitrarily, it is not arbitrary.

It can be confirmed, by subjecting the polycrystalline composite to elemental analysis by SEM-EDX, that the pixels derived from the dark field are derived from diamond particles and non-diamond carbon.

Next, an X-ray spectrum of the cross section of the polycrystalline composite is obtained with an X-ray diffractometer ("MiniFlex600" (trade name) available from Rigaku Corporation). At this time, the conditions of the X-ray diffractometer are as follows.

Characteristic X-ray: Cu-Ka (wavelength: 1.54 Å)
Tube voltage: 45 kV
Tube current: 40 mA
Filter: Multilayer mirror
Optical system: concentration method
X-ray diffraction method: θ-2θ method.

For the obtained X-ray spectrum, the following peak intensity A and peak intensity B are measured.

Peak intensity A: the peak intensity of the non-diamond carbon after subtracting the background intensity from the peak intensity near the diffraction angle $2\theta=28.5°$.

Peak intensity B: the peak intensity of the diamond particles after subtracting the background intensity from the peak intensity near the diffraction angle $2\theta=43.9°$.

The content Vd (% by volume) of the diamond particles is determined by calculating the value of {peak intensity B/(peak intensity A+peak intensity B)}×{the sum (Vd+Vg) (% by volume) of the content of the diamond particles and the content of the non-diamond carbon determined by the above SEM-EDX}. The content Vg (% by volume) of the non-diamond carbon is determined by calculating the value of {peak intensity A/(peak intensity A+peak intensity B)}×{the sum (Vd+Vg) (% by volume) of the content of the diamond particles and the content of the non-diamond carbon determined by the above SEM-EDX}. Since the non-diamond carbon and the diamond particles all are weighted electronically to the same degree, the X-ray peak intensity ratio can be taken as the volume ratio in the polycrystalline composite. No peak derived from boron is detected by the present method. Therefore, even if the polycrystalline composite contains boron, the sum of the content of the diamond particles and the content of the non-diamond carbon may be sometimes 100% by volume.

In one aspect of the present embodiment, the content Vd of the diamond particles is preferably 50% by volume or more and 98% by volume or less, and more preferably 60% by volume or more and 95% by volume or less, based on the total volume of the polycrystalline composite.

In one aspect of the present embodiment, the content Vg of the non-diamond carbon is preferably 2% by volume or more and 50% by volume or less, and more preferably 5% by volume or more and 40% by volume or less, based on the total volume of the polycrystalline composite.

In one aspect of the present embodiment, the content Vd of the diamond particles and the content Vg of the non-diamond carbon satisfy the relationship represented by the formula 1:

$$0.01 < Vg/(Vd + Vg) \le 0.5. \qquad \text{Formula 1}$$

In another aspect of the present embodiment, the content Vd of the diamond particles and the content Vg of the non-diamond carbon preferably satisfy the relationship represented by the formula 2:

$$0.03 \le Vg/(Vd + Vg) \le 0.4. \qquad \text{Formula 2}$$

(Median Diameter of Diamond Particle)

The median diameter d50 of the diamond particles is 10 nm or more and 200 nm or less, and preferably 10 nm or more and 100 nm or less. The median diameter d50 of the diamond particles of 10 nm or more produces a polycrystalline composite having an excellent strength. The median diameter d50 of the diamond particles of 200 nm or less produces a polycrystalline composite having an excellent hardness.

In the present embodiment, the median diameter d50 of the diamond particles means a value determined by measuring the median diameter d50 of each of a plurality of diamond particles in each of the arbitrarily selected five measurement fields of view and calculating the average value of these measured median diameters. A specific method is as follows.

First, a polycrystalline composite is cut at an arbitrary position to prepare a sample including a cross section of the polycrystalline composite. The cross section can be prepared with a focused ion beam device, a cross-section polisher device or the like. Then, the cross section is observed with an SEM to acquire a backscattered electron image. The magnification at the time of observing the cross section with the SEM is appropriately adjusted so that the number of diamond particles observed in the measurement field of view is 100 or more. For example, the magnification at the time of observing the cross section with the SEM may be 10,000 times.

For each of the five SEM images, the equivalent circle diameter of each diamond particle is calculated with an image analysis software ("Win ROOF ver. 7.4.5", "Win-ROOF2018" or the like available from MITANI CORPORATION), with the grain boundary of the diamond particle observed within the measurement field of view separated. At this time, the diamond particles partly out of the measurement field of view are not counted.

The median diameter d50 in each measurement field of view is calculated from the distribution of the calculated equivalent circle diameter of each diamond particle, and the average value thereof is calculated. The average value corresponds to the median diameter d50 of the diamond particles.

The present inventors have confirmed that as long as the median diameter d50 of the diamond particles is measured in the same sample, little variation is observed in the measurement results even if the selected measurement field of view in the polycrystalline composite is changed and calculations are performed multiple times. Accordingly, the inventors have believed that even if the measurement field of view is set arbitrarily, it is not arbitrary.

In the present embodiment, the particle diameter d90 of the diamond particles is 15 nm or more and 300 nm or less, and preferably 15 nm or more and 150 nm or less. The particle diameter d90 of the diamond particles of 15 nm or more produces a polycrystalline composite having an excellent strength. The particle diameter d90 of the diamond particles of 150 nm or less produces a polycrystalline composite having an excellent hardness.

In the present embodiment, the particle diameter d90 of the diamond particles means a value determined by measuring the particle diameter d90 of each of a plurality of diamond particles in each of the arbitrarily selected five measurement fields of view and calculating the average value of these measured particle diameters d90. A specific method is the same as the method for determining the median diameter d50 described above.

(Dislocation Density of Diamond Particles)

The dislocation density of the diamond particles is $1.0 \times 10^{13}$ m$^{-2}$ or more and $1.0 \times 10^{16}$ m$^{-2}$ or less, preferably $2.0 \times 10^{15}$ m$^{-2}$ or more and $1.0 \times 10^{16}$ m$^{-2}$ or less, and more preferably $2.0 \times 10^{15}$ m$^{-2}$ or more and $7.0 \times 10^{15}$ m$^{-2}$ or less. The dislocation density of the diamond particles of $1.0 \times 10^{13}$ m$^{-2}$ or more produces a polycrystalline composite having excellent toughness and hardness. The dislocation density of the diamond particles of $1.0 \times 10^{16}$ m$^{-2}$ or less produces a polycrystalline composite having an excellent strength.

No attention has conventionally been focused to the correlation, in a polycrystalline composite containing the diamond particles and non-diamond carbon and no binder phase, between the dislocation density of the diamond particles and the physical properties of the polycrystalline composite. Accordingly, the present inventors have focused attention to the correlation therebetween, and have made diligent research on the relationship between the dislocation density of the diamond particles in the polycrystalline composite and the hardness and slidability of the polycrystalline composite. As a result, it has been found for the first time that lowering the dislocation density of the diamond particles compared to conventional polycrystalline composites improves the hardness while maintaining a high slidability. When such a polycrystalline composite having excellent hardness and slidability is used for tools such as wear-resistant tools, excellent slidability and excellent wear resistance can be exhibited even if wire drawing is performed with a wire drawing die or the like. It has been revealed from this research that diamond particles in conventional polycrystalline composites (such as the polycrystalline composite described in PTL 2) have a dislocation density of $5 \times 10^{16}$ m$^{-2}$ or more and $8 \times 10^{16}$ m$^{-2}$ or less.

The dislocation density of the polycrystalline composite in the present specification is measured at a large synchrotron radiation facility (such as Kyushu Synchrotron Light Research Center (Saga Prefecture)). Specifically, it is measured by the following method.

A test specimen composed of a polycrystalline composite is prepared. The size of the test specimen is 2 mm×2 mm on the observation surface and 1.0 mm in thickness. The observation surface of the test specimen is mirror polished using a diamond slurry having an average particle diameter of 3 μm.

The test specimen is subjected to X-ray diffraction measurement under the following conditions, and the line profile of the diffraction peak from each of the orientation planes of (111), (220), (311), (331), (422), (440) and (531), which are the major orientations of diamond, is obtained.

(Measurement conditions for X-ray diffraction)

X-ray source: synchrotron radiation

Device conditions: detector NaI (fluorescence is cut by an appropriate ROI.)

Energy: 18 keV (wavelength: 0.6888 Å)

Dispersive crystal: Si (111)

Incident slit: 3 mm in width×0.5 mm in height

Light-receiving slit: double slit (3 mm in width×0.5 mm in height)

Mirror: platinum-coated mirror

Incident angle: 2.5 mrad

Scanning method: 2θ-θ scan

Peaks to be measured: 7 peaks of diamond: (111), (220), (311), (331), (422), (440) and (531). However, if profile acquisition is difficult due to texture, orientation or the like, the peak of the plane index is excluded.

Measurement conditions: 9 or more measurement points in the full width at half maximum corresponding to each measurement peak. The peak top intensity is set to 2,000 counts or more. Since the tail of the peak is also used for analysis, the measurement range is set to about 10 times the full width at half maximum.

The line profile obtained by the above X-ray diffraction measurement has a shape that includes both a true broadening attributed to physical quantities such as non-uniform strain of the test specimen and a broadening attributed to the device. In order to determine the non-uniform strain and crystallite size, a true line profile is obtained by removing the component attributed to the device from the measured line profile.

The true line profile is obtained by fitting the obtained line profile and the line profile attributed to the device with a pseudo-Voigt function and subtracting the line profile attributed to the device. LaB$_6$ is used as a reference sample for removing the broadening of the diffraction line attributed to the device. When highly collimated synchrotron radiation is used, the broadening of the diffraction line attributed to the device may be taken as zero.

The dislocation density is determined by analyzing the obtained true line profile using the modified Williamson-Hall method and the modified Warren-Averbach method. The modified Williamson-Hall method and the modified Warren-Averbach method are known line profile analysis methods that have been used to determine the dislocation density.

The modified Williamson-Hall method is represented by the following expression (I):

[Expression 1]

$$\Delta K = \frac{0.9}{D} + \left(\frac{\pi M^2 b^2}{2}\right)^{1/2} \rho^{1/2} K C^{1/2} + O\left(K^2 C\right) \tag{I}$$

wherein:

ΔK represents a half width of a line profile; D represents a crystallite size; M represents an arrangement parameter; b represents a Burgers vector. p represents the dislocation density; K represents a scattering vector; $O(K^2 C)$ represents a higher-order term of $K^2 C$; and C represents the average value of contrast factors.

C in the above expression (I) is represented by the following expression (II):

$$C = C_{h00}\left[1 - q\left(h^2 k^2 + h^2 l^2 + k^2 l^2\right)/\left(h^2 + k^2 + l^2\right)^2\right] \tag{II}$$

In the above expression (II), a contrast factor $C_{h00}$ for each of screw dislocation and edge dislocation and a coefficient q for each contrast factor are calculated by using the computing code ANIZC with a slip system of <110> {111} and elastic stiffness $C_{11}$, $C_{12}$ and $C_{44}$ of 1076 GPa, 125 GPa and 576 GPa, respectively. In the expression (II) above, h, k and l correspond to the Miller index (hkl) of diamond. The contrast factor $C_{h00}$ is 0.183 for screw dislocation and 0.204 for edge dislocation. The coefficient q for the contrast factor is 1.35 for screw dislocation and 0.30 for edge dislocation. The screw dislocation ratio is fixed at 0.5, and the edge dislocation ratio is fixed at 0.5.

Further, the relationship represented by the following expression (III) holds between the dislocation and the non-uniform strain using the contrast factor C:

$$\langle \varepsilon(L)^2 \rangle = \left(\rho C b^2 / 4\pi\right) \ln\left(R_e/L\right) \tag{III}$$

wherein: $R_e$ represents an effective radius of dislocation; and ε (L) represents non-uniform strain.

From the relationship of the above expression (III) and the Warren-Averbach expression, the following expression (IV) can be presented, and the dislocation density p and the crystallite size can be determined by the modified Warren-Averbach method.

$$\ln A(L) = \ln A^2(L) - \left(\pi L^2 \rho b^2 / 2\right) \ln\left(R_e/L\right)\left(K^2 C\right) + O\left(K^2 C\right)^2 \tag{IV}$$

wherein: A(L) represents a Fourier series; $A^S(L)$ represents a Fourier series for crystallite size; and L indicates a Fourier length.

Details of the modified Williamson-Hall method and the modified Warren-Averbach method are described in: T. Ungar and A. Borbely, "The effect of dislocation contrast on x-ray line broadening: A new approach to line profile analysis", Appl. Phys. Lett., vol. 69, no. 21, p. 3173, 1996; and T. Ungar, S. Ott, P. Sanders, A. Borbely, J. Weertman, "Dislocations, grain size and planar faults in nanostructured copper determined by high resolution X-ray diffraction and a new procedure of peak profile analysis", Acta Mater., vol. 46, no. 10, pp. 3693-3699, 1998.

The present inventors have confirmed that as long as the dislocation density of the diamond particles is measured in the same sample, little variation is observed in the measurement results even if the selected measurement field of view is changed and calculations are performed multiple times. Accordingly, the inventors have believed that even if the measurement field of view is set arbitrarily, it is not arbitrary.

<Boron>

In the present embodiment, the polycrystalline composite further comprises boron, wherein the content of boron is preferably 0.01% by mass or more and 1% by mass or less, and more preferably 0.05% by mass or more and 0.6% by mass or less, based on the total mass of the polycrystalline composite. By defining the polycrystalline composite in such a manner, the polycrystalline composite has a superior slidability and an excellent electrical conductivity. The content of boron in the polycrystalline composite can be measured by secondary ion mass spectrometry (SIMS) as described above.

In one aspect of the present embodiment, in the polycrystalline composite, the content of at least one metal element selected from the group consisting of a Group 4 element, a Group 5 element and a Group 6 element in the periodic table, and iron, aluminum, silicon, cobalt and nickel is preferably less than 1% by volume, and more preferably 0% by volume or more and 0.1% by volume or less. When two or more metal elements are contained, "the content of metal elements" is the total content of the two or more metal elements. The content of the metal elements can be confirmed by subjecting the polycrystalline composite to structure observation, elemental analysis or the like with EDX equipped with SEM.

Examples of the Group 4 element in the periodic table include titanium (Ti), zirconium (Zr) and hafnium (Hf). Examples of the Group S element in the periodic table include vanadium (V), niobium (Nb) and tantalum (Ta). Examples of the Group 6 element in the periodic table include chromium (Cr), molybdenum (Mo) and tungsten (W).

<Knoop Hardness>

The polycrystalline composite of the present embodiment preferably has a Knoop hardness at room temperature of 35 GPa or more and 120 GPa or less, and more preferably 50 GPa or more and 100 GPa or less. The Knoop hardness is determined by a Knoop hardness test that is performed under the conditions specified in JIS Z 2251:2009.

The Knoop hardness test specified in JIS Z 2251:2009 is known as one of methods for measuring the hardness of industrial materials. The Knoop hardness test is a test that determines the hardness of a material to be measured by pressing a Knoop indenter into the material to be measured at a predetermined temperature with a predetermined load (test load). In the present embodiment, the predetermined temperature is room temperature (23° C.±5° C.), and the predetermined load is 4.9 N. The Knoop indenter is a diamond indenter having a square pyramid shape with a rhombic base.

<<Tool>>

The polycrystalline composite of the present embodiment can be suitably used for cutting tools, wear-resistant tools, grinding tools, tools for friction stir welding. styluses and the like, because it has excellent slidability and hardness. That is, the tool of the present embodiment comprises the polycrystalline composite. The tool has an excellent wear resistance and an excellent slidability in wire drawing of various materials. When the tool is a wear-resistant tool, the wear-resistant tool is particularly suitable for wire drawing of copper wire, stainless steel wire and the like.

The tool may be entirely composed of polycrystalline composite, or only a part of the tool (for example, in the case of a wear-resistant tool such as a wire drawing die, the part in contact with the wire) may be composed of the polycrystalline composite.

Examples of the cutting tool include a drill, an end mill, an indexable cutting insert for drills, an indexable cutting insert for end mills, an indexable cutting insert for milling, an indexable cutting insert for turning, a metal saw, a gear cutting tool, a reamer, a tap and cutting bit.

Examples of the wear-resistant tool include a die, a scriber, a scribing wheel and a dresser.

Examples of the grinding tool include an abrasive wheel.

<<Method for Manufacturing Polycrystalline Composite>>

<Method for Manufacturing Polycrystalline Composite (1)>

The first method for manufacturing a polycrystalline composite according to the present embodiment comprises:

preparing a non-diamond carbon material as a starting material (first step);

increasing the pressure from the starting pressure and starting temperature while maintaining the temperature at 300° C. or less so as to move from the graphite stable region to the diamond region (second step);

maintaining the pressure and temperature in the graphite stable region for 10 minutes or more and 60 minutes or less after increasing the temperature to move from the diamond region to the graphite stable region (third step); and further increasing the pressure and temperature to the sintering pressure and sintering temperature to convert the non-diamond carbon material into diamond particles and sinter them at the sintering pressure and sintering temperature (fourth step).

<First Step: Preparing Non-diamond Carbon Material>

In this step, a non-diamond carbon material is prepared as a starting material. The non-diamond carbon material is not limited as long as it is a carbon material. The non-diamond carbon material preferably comprises low crystalline graphite, pyrolytic graphite or amorphous carbon. These may be used alone or in combination of two or more.

The non-diamond carbon material preferably has a purity of 99% by volume or more, more preferably 99.5% by volume or more, even more preferably 99.9% by volume or more, and most preferably 100% by volume. In other words, the non-diamond carbon material has preferably no iron group element metal, which is an impurity, from the viewpoint of suppressing the growth of crystalline grains. Examples of the iron group element metal include iron (Fe), cobalt (Co) and nickel (Ni).

The non-diamond carbon material preferably has low concentrations of impurities such as hydrogen, oxygen and nitrogen, from the viewpoint of suppressing the growth of crystalline grains and promoting the direct conversion of the non-diamond carbon material to diamond. The concentration of each of hydrogen, oxygen and nitrogen in the non-diamond carbon material is preferably 0.1% by volume or less and more preferably 0.01% by volume or less. Further, the total impurity concentration in the non-diamond carbon material is preferably 0.3% by volume or less and more preferably 0.1% by volume or less.

The concentration of each of the impurities in non-diamond carbon material can be measured by secondary ion mass spectrometry (SIMS). As an example of this measurement method, the impurity concentration is measured using "CAMECA IMS-7f" (available from Ametech Inc.) as a device, with a primary ion species of Cs⁺, a primary acceleration voltage of 15.0 kV and a detection area of φ 30 μm.

<Second Step: Increasing Pressure While Maintaining Low Temperature so as to Move from Graphite Stable Region to Diamond Region>

In this step, the pressure is increased from the starting pressure and starting temperature while maintaining the temperature at 300° C. or less so as to move from the graphite stable region to the diamond region. As used herein, the term "graphite stable region" means a region, in which graphite is thermodynamically stable, in the phase equilibrium diagram of carbon (FIG. 1). The relationship represented by the following formula holds between the pressure P (unit: GPa) and the temperature T (unit: ° C.) in the graphite stable region:

$$P < T \times 0.00286 + 1.4185$$

In the present embodiment, the term "diamond region" means a region, in which diamond is thermodynamically stable, in the phase equilibrium diagram of carbon (FIG. 1). The relationship represented by the following formula holds between the pressure P (unit: GPa) and the temperature T (unit: ° C.) in the diamond region:

$$P > T \times 0.00286 + 1.4185$$

The dislocation density of interest can be achieved by increasing the pressure from the starting pressure and starting temperature so as to move from the graphite stable region to the diamond region.

In the present embodiment, the starting temperature is a normal temperature (23±5° C.) and the starting pressure is the atmospheric pressure (1013.25 hPa).

In this step, when the pressure is increased from the starting pressure and the starting temperature, it is preferably performed while maintaining the temperature at 300° C. or less, and more preferably at 0° C. or more and 300° C. or less. In one aspect of the present embodiment, when the pressure is increased from the starting pressure and the starting temperature, the temperature may be increased within a range not exceeding 300° C.

<Third Step: Maintaining Pressure and Temperature in Graphite Stable Region>

In this step, the pressure and temperature in the graphite stable region is maintained for 10 minutes or more and 60 minutes or less after increasing the temperature to move from the diamond region to the graphite stable region. The dislocation density can be increased by moving the pressure and temperature phase back from the diamond region to the graphite stable region and maintaining the pressure and temperature in the graphite stabile region.

The pressure in the graphite stable region is preferably 0 GPa or more and 5 GPa or less, and more preferably 0 GPa or more and 3 GPa or less.

The temperature in the graphite stable region is preferably 0° C. or more and 1,500° C. or less, and more preferably 0° C. or more and 1,000° C. or less.

In one aspect of the present embodiment, the pressure P in the graphite stable region is 0 GPa or more and 3 GPa or less, and the temperature T in the graphite stable region is 25° C. or more and 1,000° C. or less. The pressure P and the temperature T preferably satisfy the relationship represented by the following formula:

$$P < T \times 0.00286 + 1.4185.$$

The time for which the pressure and temperature are maintained in the graphite stable region is preferably 10 minutes or more, and more preferably 20 minutes or more. The upper limit of the time for which the pressure and temperature are maintained in the graphite stable region is preferably 60 minutes or less, from the viewpoint of manufacturing (such as the cycle time of production).

<Fourth Step: Converting into Diamond Particles and Sintering Them>

In this step, the pressure and temperature are further increased to the sintering pressure and sintering temperature to convert the non-diamond carbon material into diamond particles and sinter them at the sintering pressure and sintering temperature. In one aspect of the present embodiment, the temperature and pressure may be increased to the sintering pressure and the sintering temperature simultaneously, or the pressure may be increased to the sintering pressure followed by increasing the temperature to the sintering temperature.

The sintering pressure is preferably 8 GPa or more and 20 GPa or less, and more preferably 10 GPa or more and 16 GPa or less.

The sintering temperature is preferably 1,800° C. or more and 2,800° C. or less, and more preferably 1,800° C. or more and 2,600° C. or less.

The sintering time at the sintering pressure and the sintering temperature is preferably 1 minute or more and 20 minutes or less, more preferably 5 minutes or more and 20 minutes or less, and even more preferably 10 minutes or more and 20 minutes or less.

<Method for Manufacturing Polycrystalline Composite (2)>

The second method for manufacturing a polycrystalline composite according to the present embodiment comprises:
  preparing a non-diamond carbon material as a starting material (first step);
  increasing the pressure and temperature from the starting pressure and starting temperature so as to pass through the graphite stable region (second step);
  maintaining the pressure and temperature near the phase boundary for 10 minutes or more and 60 minutes or less when the pressure is increased to cross the diamond region (third step); and
  further increasing the pressure and temperature to the sintering pressure and sintering temperature to convert the non-diamond carbon material into diamond particles and sinter them at the sintering pressure and sintering temperature (fourth step).
The polycrystalline composite obtained by such a method tends to have a lower dislocation density than the polycrystalline composite obtained by the first manufacturing method.

<First Step: Preparing Non-diamond Carbon Material>

In the present step, a non-diamond carbon material is prepared as a starting material. The non-diamond carbon material to be used may be the same as that in the first manufacturing method described above.

<Second Step: Increasing Pressure and Temperature so as to Pass Through Graphite Stable Region>

In this step, the pressure and temperature are increased from the starting pressure and starting temperature so as to pass through the graphite stable region.

The dislocation density of the finally obtained polycrystalline diamond is lower by a combination of increasing the pressure and temperature from the starting pressure and starting temperature so as to pass through the graphite stable region and maintaining the pressure and temperature near the phase boundary as described later.

In the present embodiment, the starting temperature is a normal temperature (23±5° C.), and the starting pressure is the atmospheric pressure (1013.25 hPa).

<Third Step: Maintaining Pressure and Temperature near Phase Boundary>

In this step, the pressure and temperature are maintained near the phase boundary for 10 minutes or more and 60 minutes or less when the pressure is increased to cross the diamond region.

As used herein, the term "phase boundary" means a boundary between the graphite stable region and the diamond region described above. The dislocation density of the polycrystalline diamond is decreased by maintaining the pressure and temperature near the phase boundary, so that the resulting polycrystalline diamond is improved in thermal conductivity.

The pressure near the phase boundary is preferably 1.5 GPa or more and 8 GPa or less, and more preferably 2 GPa or more and 7 GPa or less. Here, the relationship represented by the following expression holds between the pressure P (unit: GPa) and the temperature T (unit: ° C.) at the phase boundary:

$$P = T \times 0.00286 + 1.4185.$$

The temperature near the phase boundary is preferably 25° C. or more and 2,300° C. or less, and more preferably 100° C. or more and 2,000° C. or less.

In one aspect of the present embodiment, the pressure P near the phase boundary is 2 GPa or more and 3 GPa or less, and the temperature T near the phase boundary is 300° C. or more and 500° C. or less. The pressure P and the temperature T preferably satisfy the relationship represented by the above expression.

The time for which the pressure and temperature are maintained near the phase boundary is preferably 10 minutes or more, and more preferably 20 minutes or more. The upper limit of the time for which the pressure and temperature are maintained near the phase boundary is preferably 60 minutes or less, from the viewpoint of manufacturing (such as the cycle time of production).

<Fourth Step: Converting into Diamond Particles and Sintering Them>

In this step, the pressure and temperature are further increased to the sintering pressure and sintering temperature to convert the non-diamond carbon material into diamond particles and sinter them at the sintering pressure and sintering temperature. A specific method to be used can be the same method as the first manufacturing method described above.

The high-pressure and high-temperature generator to be used in the first and second methods for manufacturing a polycrystalline composite of the present embodiment is not limited as long as it is a device that provides the pressure and temperature conditions at which the diamond phase is a thermodynamically stable phase. However, the generator is preferably a high-pressure and high-temperature generator or a multi-anvil type high-pressure and high-temperature generator from the viewpoint of improving productivity and workability. The vessel for containing the non-diamond carbon material as a raw material is not limited as long as it is made from a material that is resistant to high pressures and high temperatures. For example, the material to be used is suitably Ta, Nb or the like.

In order to prevent contamination of impurities into the polycrystalline composite, for example, the non-diamond carbon material as a raw material is first placed in a capsule made of a metal having a high melting point such as Ta or Nb, heated in a vacuum and sealed to remove adsorbed gases and air from the non-diamond carbon material. Thereafter, the second to fourth steps are preferably performed. In the method for manufacturing a polycrystalline composite according to the present embodiment, the boundary between the graphite stable region and the diamond region are crossed multiple times when the temperature and pressure are increased from the starting temperature and starting pressure to the sintering temperature and sintering pressure. The dislocation density in the polycrystalline composite to be produced can be controlled by increasing the temperature and pressure in this way.

EXAMPLES

The present embodiments will be more specifically described with reference to Examples. However, the present embodiments are not limited by these Examples.

Preparation of Polycrystalline Composite

<First Step: Preparing Non-diamond Carbon Material>

For each of Samples 1 to 14, the following non-diamond carbon material was first prepared as a raw material.

Non-Diamond Carbon Material

Samples 1 to 5, 8 to 11 and 13: graphite powder having a particle diameter of 3 μm Samples 6, 7 and 12: powder obtained by adding boron to graphite powder having a particle diameter of 3 Ξm Sample 14: powder obtained by adding iron group elements (Fe, Co and Ni) to graphite powder having a particle size of 3 μm <Second Step: Increasing Pressure While Maintaining Low Temperature so as to Move from Graphite Stable Region to Diamond Region, or Increasing Pressure and Temperature so as to Pass Through Graphite Stable Region>

Next, the non-diamond carbon material was placed in a Ta capsule, heated in a vacuum, and sealed. Thereafter, the pressure or the temperature was increased from the starting pressure and starting temperature shown in Table 1 to the end-point pressure and the end-point temperature in the first stage shown in Table 1 with using a high-pressure and high-temperature generator. The starting pressure in Table 1, which is written as "0 GPa", means the atmospheric pressure. The end-point pressure and the end-point temperature in the first stage for each of Samples 1 to 3, Samples 5 to 7 and Samples 10 to 14 correspond to the pressure P (unit: GPa) and temperature T (unit: ° C.) in the diamond region described above, respectively, and the relationship represented by the following formula holds.

$$P > T \times 0.00286 + 1.4185$$

The end-point pressure and the end-point temperature in the first stage for each of Sample 4, Sample 8 and Sample 9 correspond to the pressure P (unit: GPa) and temperature T (unit: ° C.) in the graphite stable region described above, respectively, and the relationship represented by the following formula holds.

$$P < T \times 0.00286 + 1.4185$$

diamond particles and sintered by pressurizing and heating it for the sintering time of the fourth stage shown in Table 1. Polycrystalline composites of Samples 1 to 14 were obtained by the above procedure. Each of Samples 1 to 3, Samples 5 to 7 and Samples 10 to 14 was manufactured by the first manufacturing method described above. Each of Sample 4, Sample 8 and Sample 9 was manufactured by the second manufacturing method described above. For each of Samples 1 to 13, neither sintering aid nor binder material was added to the non-diamond carbon material. As Sample 15, a commercially available sintered diamond (trade name: WD705F, available from SUMITOMO ELECTRIC HARD-METAL CORP.) was prepared. The sintered diamond is composed of diamond particles (particle diameter: 1 jun) (83% by volume) and a metal binder material (remainder). Samples 1 to 9 correspond to the "inventive" Examples. Samples 10 to 12, 14 and IS correspond to the Comparative Examples. Sample 13 corresponds to Reference Example.

TABLE 1

| | Second step | | | | | Third step | | | Fourth step | | | | | |
| | Starting point | | First stage | | | Second stage | | | Third stage | | | Fourth stage | | |
| Sam-ple | Starting temper-ature ° C. | Starting pressure GPa | End-point temper-ature ° C. | End-point pressure GPa | Holding time minute | End-point temper-ature ° C. | End-point pressure GPa | Holding time minute | End-point temper-ature ° C. | End-point pressure GPa | Holding time minute | Sintering temper-ature ° C. | Sin-tering pressure GPa | Sin-tering time minute |
|---|---|---|---|---|---|---|---|---|---|---|---|---|---|---|
| 1 | 25 | 0 | 25 | 3 | 0 | 1000 | 3 | 20 | 1000 | 11 | 0 | 1850 | 11 | 10 |
| 2 | 25 | 0 | 25 | 3 | 0 | 1000 | 3 | 10 | 1000 | 11 | 0 | 2100 | 11 | 20 |
| 3 | 25 | 0 | 25 | 3 | 0 | 1000 | 3 | 10 | 1000 | 13 | 0 | 2250 | 13 | 20 |
| 4 | 25 | 0 | 300 | 0 | 0 | 300 | 2.28 | 10 | 300 | 13 | 0 | 2250 | 13 | 20 |
| 5 | 25 | 0 | 25 | 3 | 0 | 1000 | 3 | 10 | 1000 | 16 | 0 | 1900 | 16 | 20 |
| 6 | 25 | 0 | 25 | 3 | 0 | 1000 | 3 | 10 | 1000 | 16 | 0 | 1900 | 16 | 20 |
| 7 | 25 | 0 | 25 | 3 | 0 | 1000 | 3 | 10 | 1000 | 16 | 0 | 1900 | 16 | 20 |
| 8 | 25 | 0 | 500 | 0 | 0 | 500 | 2.85 | 10 | 500 | 16 | 0 | 1900 | 16 | 20 |
| 9 | 25 | 0 | 500 | 0 | 0 | 500 | 2.85 | 10 | 500 | 10 | 0 | 2600 | 10 | 30 |
| 10 | 25 | 0 | 25 | 3 | 0 | 1000 | 3 | 10 | 1000 | 16 | 0 | 2600 | 16 | 20 |
| 11 | 25 | 0 | 25 | 3 | 0 | 1000 | 3 | 20 | 1000 | 10 | 0 | 1800 | 10 | 10 |
| 12 | 25 | 0 | 25 | 3 | 0 | 1000 | 3 | 10 | 1000 | 11 | 0 | 2800 | 11 | 20 |
| 13 | 25 | 0 | 25 | 3 | 0 | 1000 | 3 | 120 | 1000 | 11 | 0 | 1850 | 11 | 10 |
| 14 | 25 | 0 | 25 | 3 | 0 | 1000 | 3 | 10 | 1000 | 13 | 0 | 2250 | 13 | 20 |
| 15 | — | — | — | — | — | — | — | — | — | — | — | — | — | — |

<Third Step: Maintaining Pressure and Temperature in Graphite Stable Region, or Maintaining Pressure and Temperature near Phase Boundary>

The temperature or pressure was increased from the first stage to reach the end-point pressure and end-point temperature in the second stage shown in Table 1, which was maintained for the holding time in the second stage shown in Table 1. The end-point pressure and end-point temperature in the second stage for each of Samples 1 to 3, Samples 5 to 7 and Samples 10 to 14 correspond to the pressure P (unit: GPa) and temperature T (unit: ° C.) in the above-described graphite stable region, respectively. The end-point pressure and end-point temperature in the second stage for each of Sample 4, Sample 8 and Sample 9 correspond to the pressure P (unit: GPa) and temperature T (unit: ° C.) near the above-described phase boundary, respectively.

<Fourth Step: Converting into Diamond Particles and Sintering Them>

After performing the third step, the temperature and pressure were increased via the end-point pressure and end-point temperature in the third stage shown in Table 1 to the sintering pressure and sintering temperature of the fourth stage. The non-diamond carbon material was converted into Characterization of Polycrystalline Composite For the obtained polycrystalline composite, the contents of diamond particles, non-diamond carbon and boron, the content of metal elements, the content of inevitable impurities, the median diameter d50 and particle diameter d90 of the diamond particles, the dislocation density of the diamond particles and the resistivity of the diamond particles were measured as shown below.

<Contents of Diamond Particles, Non-diamond Carbon and Boron>

The contents of the diamond particles and non-diamond carbon in the polycrystalline composite were identified by using a combination of both of a method using an EDX equipped with an SEM and an X-ray diffraction method. The content of boron in the polycrystalline composite was identified by SIMS. The specific measurement method is the same as the method described in the above section [Details of Embodiment of the Present Disclosure], and the description thereof will not therefore be repeated. The results are shown in Table 2 (see columns "Content of diamond particles", "Content of non-diamond carbon" and "Boron content").

<Content of Metal Elements (Content of Iron Group Elements>

The content of iron group elements in each of the polycrystalline composite and sintered diamond was identified by an EDX equipped with SEM. Specific measurement conditions are as follows. The results are shown in Table 2 (see the column "Content of iron group elements Fe, Co and Ni").

Conditions for EDX
acceleration voltage 15 kV

<Content of Inevitable Impurities>

The content of inevitable impurities in the polycrystalline composite was identified by SIMS. The specific measurement method is the same as the method described in the above section [Details of Embodiment of the Present Disclosure], and the description thereof will not therefore be repeated. The results are shown in Table 2 (see the column "Content of inevitable impurities")

<Median Diameter d50 and Particle Diameter d90 of Diamond Particles>

The median diameter d50 and particle diameter d90 of diamond particles contained in each polycrystalline composite were measured. The specific measurement method is the same as the method described in the above section [Details of Embodiment of the Present Disclosure], and the description thereof will not therefore be repeated. The results are shown in Table 3 (see the columns "Median diameter d50" and "Particle diameter d90").

<Dislocation Density of Diamond Particles>

The dislocation density of diamond particles in a polycrystalline composite was measured. The specific measurement method is the same as the method described in the above section [Details of Embodiment of the Present Disclosure], and the description thereof will not therefore be repeated. The results are shown in Table 3 (see the column "Dislocation density").

<Resistivity of Diamond Particles>

The resistivity of diamond particles in the polycrystalline composite was measured by the four-probe method in accordance with JIS standard JIS K 7194. At this time, the sample size was $\varphi$ 5×1 mm. The results are shown in Table 3 (see the column "Resistivity"). In Table 3, "–" means that the measurement was not able to be performed because the polycrystalline composite was an insulating material.

Evaluation of Tool Comprising Polycrystalline Composite

<Wire Drawing Test>

In order to investigate the wear resistance and slidability of a wire drawing die comprising the polycrystalline composite of each of Samples 1 to 14 or the sintered diamond of Sample 15, a wire drawing die (@ 0.1) was prepared using the polycrystalline composite or the sintered diamond and subjected to wire drawing under the following wire drawing conditions. The wire drawing time was calculated when the surface roughness Ra of the drawn metal wire reached 0.020 μm. At this time, the ratio (die life ratio) of the wire drawing time relative to the wire drawing time for a wire drawing die made of monocrystalline diamond (SUMICRYSTAL, available from SUMITOMO ELECTRIC HARDMETAL CORP.) was calculated. The results are shown in Table 3.

(Wire Drawing Conditions)

Wire: SUS316 wire, $\varphi$ 110 μm

Wire drawing speed. 200 m/min

TABLE 2

| Sample | Content of diamond particles Vd % by volume | Content of non-diamond carbon Vg % by volume | Vg/ (Vd + Vg) | Boron content % by mass | Content of iron group elements Fe, Co and Ni % by volume | Content of inevitable impurities % by volume |
|---|---|---|---|---|---|---|
| 1 | 50 | 50 | 0.50 | 0 | 0 | 0.01 |
| 2 | 72 | 28 | 0.28 | 0 | 0 | 0.02 |
| 3 | 98 | 2 | 0.02 | 0 | 0 | 0.01 |
| 4 | 98 | 2 | 0.02 | 0 | 0 | 0.01 |
| 5 | 92 | 8 | 0.08 | 0 | 0 | 0.01 |
| 6 | 92 | 8 | 0.08 | 0.01 | 0 | 0.02 |
| 7 | 92 | 8 | 0.08 | 1 | 0 | 0.01 |
| 8 | 92 | 8 | 0.08 | 0 | 0 | 0.01 |
| 9 | 82 | 18 | 0.18 | 0 | 0 | 0.01 |
| 10 | 100 | 0 | 0.00 | 0 | 0 | 0.01 |
| 11 | 33 | 67 | 0.67 | 0 | 0 | 0.01 |
| 12 | 98 | 2 | 0.02 | 1.5 | 0 | 0.01 |
| 13 | 50 | 50 | 0.50 | 0 | 0 | 0.01 |
| 14 | 96.5 | 2 | 0.02 | 0 | 1.5 | 0.01 |
| 15 | —* | 0 | — | 0 | — | — |

*means "not measured".

TABLE 3

| Sample | Median diameter d50 nm | Particle diameter d90 nm | Dislocation density ×10¹⁵/m² | Resistivity mΩ · cm | Wire drawing evaluation (die life ratio*) |
|---|---|---|---|---|---|
| 1 | 31 | 42 | 10 | 0.0001 | 3.1 |
| 2 | 42 | 57 | 3 | — | 3.5 |
| 3 | 55 | 73 | 5.2 | — | 6.5 |
| 4 | 59 | 79 | 0.7 | — | 5.1 |
| 5 | 35 | 49 | 6.7 | — | 5.3 |
| 6 | 35 | 48 | 6.7 | — | 5.8 |

TABLE 3-continued

| Sample | Median diameter d50 nm | Particle diameter d90 nm | Dislocation density ×10$^{15}$/m$^2$ | Resistivity mΩ · cm | Wire drawing evaluation (die life ratio*) |
|---|---|---|---|---|---|
| 7 | 35 | 49 | 6.7 | 1 | 6.1 |
| 8 | 35 | 47 | 0.3 | — | 4.5 |
| 9 | 157 | 208 | 0.01 | — | 2.8 |
| 10 | 130 | 172 | 2.5 | — | 2 |
| 11 | 30 | 41 | 10 | — | 0.1 |
| 12 | 203 | 284 | 6.7 | 0.5 | 2.5 |
| 13 | 30 | 41 | 11 | — | 3.2 |
| 14 | 65 | 87 | 5.0 | — | 1.9 |
| 15 | 1000 | 1400 | 4.8 | 0.0001 | 0.2 |

*Die life ratio of the wire drawing time for a wire drawing die made of monocrystalline diamond

Results

It was shown from the results in Table 2 that Samples 1 to 9 (Examples) had a die life ratio of 2.8 to 6.5 and excellent slidability and wear resistance. In contrast, Samples 10 to 12, 14 and 15 (Comparative Examples) had a die life ratio of 0.1 to 2.5. Sample 13 (Reference Example) had a die life ratio of 3.2, but for Sample 13, the holding time in the third step was very long. It was shown from the above results that the tools according to Examples had excellent slidability and wear resistance.

Although the present embodiments and examples of the present disclosure have been described as above, the features of the above-described embodiments and examples are contemplated from the beginning to be appropriately combined or variously modified.

The embodiments and examples disclosed herein should be understood as exemplary and not as restrictive in all respects. The scope of the present invention is defined by the claims rather than the above description, and is intended to include the meanings equivalent to the claims and all modifications within the scope of the claims.

The invention claimed is:

1. A polycrystalline composite comprising diamond particles and non-diamond carbon, wherein:
a sum of a content Vd of the diamond particles and a content Vg of the non-diamond carbon is more than 99% by volume based on the total volume of the polycrystalline composite;
a median diameter d50 of the diamond particles is 10 nm or more and 200 nm or less;
a dislocation density of the diamond particles is 1.0×10$^{13}$ m$^{-2}$ or more and 1.0×10$^{16}$ m$^{-2}$ or less; and
the content Vd of the diamond particles and the content Vg of the non-diamond carbon satisfy a relationship represented by formula 1:

$$0.01 < Vg/(Vd + Vg) \leq 0.5. \qquad \text{Formula 1}$$

2. The polycrystalline composite according to claim 1, wherein the dislocation density of the diamond particles is 2.0×10$^{15}$ m$^{-2}$ or more and 1.0×10$^{16}$ m$^{-2}$ or less.

3. The polycrystalline composite according to claim 2, wherein the dislocation density of the diamond particles is 2.0×10$^{15}$ m$^{-2}$ or more and 7.0×10$^{15}$ m$^{-2}$ or less.

4. The polycrystalline composite according to claim 1, wherein the median diameter d50 of the diamond particles is 10 nm or more and 100 nm or less.

5. The polycrystalline composite according to claim 1, further comprising boron, wherein
a content of the boron is 0.01% by mass or more and 1% by mass or less based on a total mass of the polycrystalline composite.

6. The polycrystalline composite according to claim 1, wherein the content Vd of the diamond particles and the content Vg of the non-diamond carbon satisfy a relationship represented by formula 2:

$$0.03 \leq Vg/(Vd + Vg) \leq 0.4. \qquad \text{Formula 2}$$

7. The polycrystalline composite according to claim 1, wherein a content of at least one metal element selected from the group consisting of a Group 4 element, a Group 5 element and a Group 6 element in the periodic table, and iron, aluminum, silicon, cobalt and nickel is less than 1% by volume.

8. The polycrystalline composite according to claim 1, wherein a content of at least one inevitable impurity selected from the group consisting of hydrogen, oxygen, nitrogen, an alkali metal element and an alkaline earth metal element is less than 0.1% by volume.

9. A tool comprising the polycrystalline composite according to claim 1.

* * * * *